US010515129B2

(12) United States Patent
Leung

(10) Patent No.: US 10,515,129 B2
(45) Date of Patent: Dec. 24, 2019

(54) FACILITATING INTER-ENTITY COMMUNICATIONS

(71) Applicant: UpBreeze Incorporated Limited, Kwun Tong (HK)

(72) Inventor: Hong C. Leung, Kwun Tong (HK)

(73) Assignee: UpBreeze Incorporated Limited, Kwun Tong (HK)

( * ) Notice: Subject to any disclaimer, the term of this patent is extended or adjusted under 35 U.S.C. 154(b) by 262 days.

(21) Appl. No.: 15/356,209

(22) Filed: Nov. 18, 2016

(65) Prior Publication Data

US 2017/0068674 A1 Mar. 9, 2017

Related U.S. Application Data

(63) Continuation-in-part of application No. 14/738,476, filed on Jun. 12, 2015, now Pat. No. 10,013,495.

(60) Provisional application No. 62/012,252, filed on Jun. 13, 2014.

(51) Int. Cl.
*G06F 17/30* (2006.01)
*G06F 7/00* (2006.01)
*G06F 16/9535* (2019.01)

(52) U.S. Cl.
CPC ................ *G06F 16/9535* (2019.01)

(58) Field of Classification Search
CPC ................. G06F 17/30867; G06F 16/9535
USPC .......................................... 707/733
See application file for complete search history.

(56) References Cited

U.S. PATENT DOCUMENTS

| 6,876,977 | B1  | 4/2005  | Marks |
| 7,330,971 | B1  | 2/2008  | Kukreja et al. |
| 7,346,844 | B1* | 3/2008  | Baer ................ G06Q 30/0603 434/362 |
| 7,730,014 | B2  | 6/2010  | Hartenstein et al. |
| 8,504,534 | B1* | 8/2013  | Tendick ............ G06F 17/2264 707/694 |
| 9,953,085 | B1* | 4/2018  | Collins ............ G06F 16/24568 |
| 2003/0225689 | A1 | 12/2003 | MacFarlane et al. |
| 2003/0236977 | A1 | 12/2003 | Levas et al. |
| 2004/0230601 | A1 | 11/2004 | Joao et al. |
| 2005/0192822 | A1 | 9/2005  | Hartenstein et al. |
| 2005/0203824 | A1 | 9/2005  | Freud et al. |
| 2006/0116918 | A1 | 6/2006  | Flora et al. |

(Continued)

Primary Examiner — Kuen S Lu
(74) Attorney, Agent, or Firm — Invoke

(57) ABSTRACT

Techniques for facilitating inter-entity communications are disclosed. Members of different entities may use different entity-specific parameters to reference similar topics. A master parameter is a term that is used by an inter-entity communication engine to reference a particular topic. The inter-entity communication engine obtains a request for content items associated with a particular master parameter. The inter-entity communication engine determines that a first entity-specific parameter, associated with a first entity, corresponds to the particular master parameter. Further, the inter-entity communication engine determines that a second entity-specific parameter, associated with a second entity, corresponds to the particular master parameter. The inter-entity communication engine returns, in response to the request, both (a) content items that are generated by a member of the first entity and include the first entity-specific parameter and (b) content items that are generated by a member of the second entity and include the second entity-specific parameter.

20 Claims, 7 Drawing Sheets

(56) References Cited

U.S. PATENT DOCUMENTS

| | | |
|---|---|---|
| 2006/0235713 A1 | 10/2006 | Tobler et al. |
| 2008/0033739 A1 | 2/2008 | Zuckerberg et al. |
| 2008/0065514 A1 | 3/2008 | Eaton |
| 2008/0270538 A1 | 10/2008 | Garg et al. |
| 2009/0292641 A1 | 11/2009 | Weiss |
| 2011/0125891 A1 | 5/2011 | Kawai |
| 2011/0238755 A1 | 9/2011 | Khan et al. |
| 2012/0054135 A1 | 3/2012 | Salaka et al. |
| 2012/0223951 A1 | 9/2012 | Dunn et al. |
| 2013/0086641 A1 | 4/2013 | Mehr et al. |
| 2013/0103436 A1 | 4/2013 | Torkelson |
| 2013/0191892 A1 | 7/2013 | Cadden et al. |
| 2013/0198290 A1 | 8/2013 | Thomas |
| 2013/0268444 A1 | 10/2013 | Namgoong et al. |
| 2013/0343729 A1* | 12/2013 | Rav-Acha .............. G11B 27/28 386/285 |
| 2014/0026083 A1* | 1/2014 | Waisbein .............. G06F 3/0482 715/763 |
| 2014/0032914 A1 | 1/2014 | Foygel |
| 2014/0142984 A1 | 5/2014 | Wright et al. |
| 2015/0052009 A1 | 2/2015 | Ketchell, III |
| 2015/0127565 A1 | 5/2015 | Chevalier et al. |
| 2015/0220518 A1* | 8/2015 | Le Chevalier .......... G06F 16/93 707/741 |
| 2015/0264093 A1 | 9/2015 | Madisch et al. |
| 2016/0150089 A1 | 5/2016 | Garg |

* cited by examiner

Relationship Graph
200

FACILITATING INTER-ENTITY COMMUNICATIONS

BENEFIT CLAIMS; INCORPORATION BY REFERENCE

This application is a continuation-in-part of U.S. Non-Provisional patent application Ser. No. 14/738,476, filed Jun. 12, 2015, which claims the benefit of U.S. Provisional Patent Application 62/012,252, filed Jun. 13, 2014; each of which is hereby incorporated by reference.

The Applicant hereby rescinds any disclaimer of claim scope in the parent application(s) or the prosecution history thereof and advises the USPTO that the claims in this application may be broader than any claim in the parent application(s).

TECHNICAL FIELD

The present disclosure relates to networked communications. In particular, the present disclosure relates to facilitating inter-entity communications.

BACKGROUND

Users of a communication platform may desire to find content items related to a particular topic. However, different entities may refer to the same topic using different terms. As an example, an area of study may be electricity, electronics, and electromagnetism. Students of Cornell University may refer to the area of study as "Electrical and Computer Engineering." Students of the Massachusetts Institute of Technology may refer to the area of study as "Electrical Engineering and Computer Science."

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. INTER-ENTITY COMMUNICATION SYSTEM ARCHITECTURE
3. GENERATING A MAPPING BETWEEN AN ENTITY-SPECIFIC PARAMETER AND A MASTER PARAMETER
4. RETURNING CONTENT ITEMS ASSOCIATED WITH A PARTICULAR MASTER PARAMETER
5. MISCELLANEOUS; EXTENSIONS
6. HARDWARE OVERVIEW

1. General Overview

One or more embodiments include returning content items including different entity-specific parameters that correspond to a same master parameter in response to a request for content items associated with the master parameter. An entity-specific parameter is a term that is commonly recognized, adopted, and/or used by members of an entity to reference a particular topic. Additionally or alternatively, an entity-specific parameter is a term that is established, determined, and/or chosen by an entity to reference a particular topic. Members of different entities may use different entity-specific parameters to reference similar topics. A master parameter is a term that is used by an inter-entity communication engine to reference a particular topic. The inter-entity communication engine obtains a request for content items associated with a particular master parameter. The inter-entity communication engine determines that a first entity-specific parameter, associated with a first entity, corresponds to the particular master parameter. Further, the inter-entity communication engine determines that a second entity-specific parameter, associated with a second entity, corresponds to the particular master parameter. The inter-entity communication engine returns, in response to the request, both (a) content items that are generated by a member of the first entity and include the first entity-specific parameter and (b) content items that are generated by a member of the second entity and include the second entity-specific parameter.

One or more embodiments described in this Specification and/or recited in the claims may not be included in this General Overview section.

2. Inter-Entity Communication System Architecture

Figure 1:
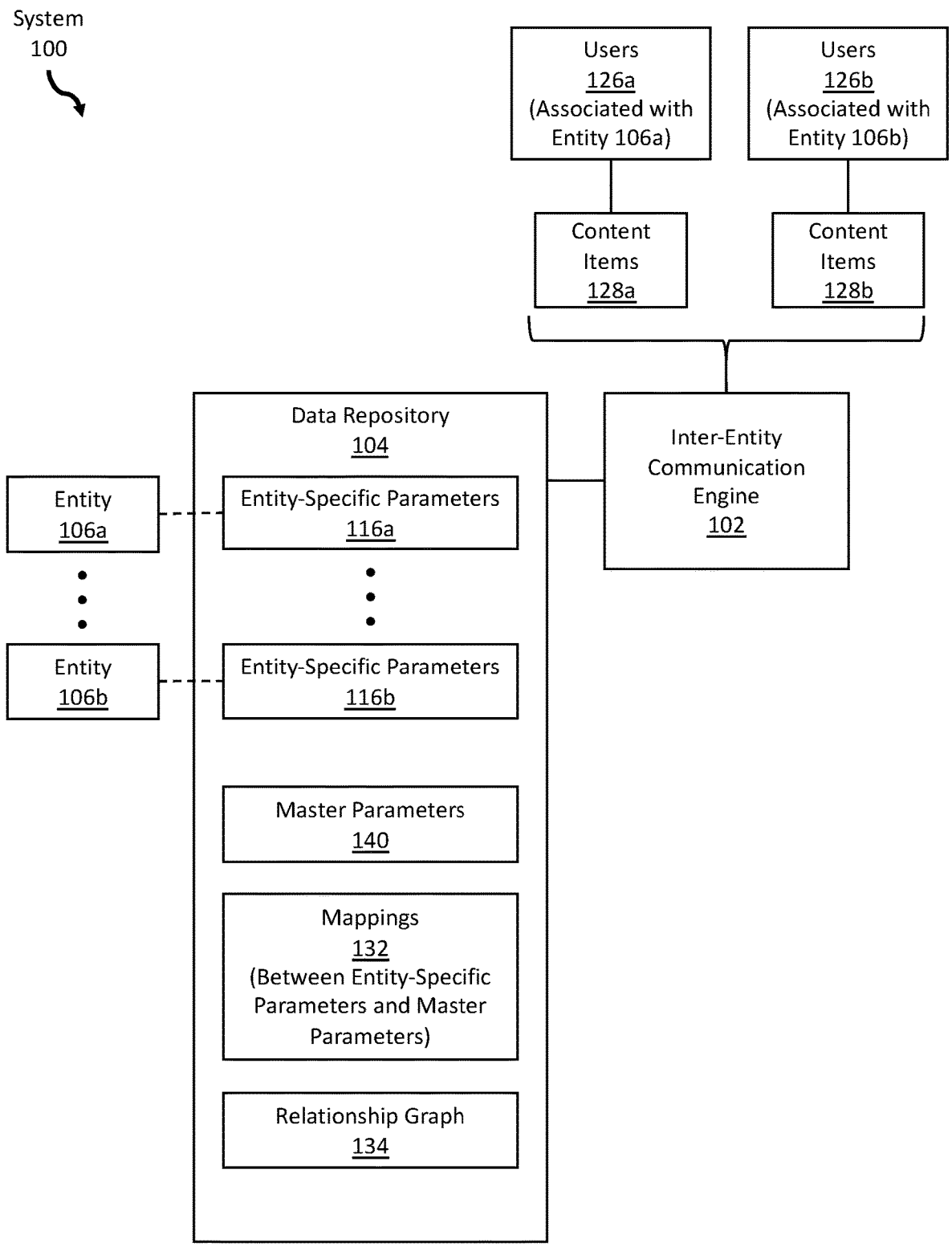
FIG. 1 illustrates an inter-entity communication system, in accordance with one or more embodiments.

FIG. 1 illustrates an inter-entity communication system, in accordance with one or more embodiments. As illustrated in FIG. 1, a system 100 includes an inter-entity communication engine 102, a data repository 104, entities 106a-b, content items 128a-b, users 126a-b. In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

In one or more embodiments, an entity (such as entities 106a-b) is an organization, institution, corporation, and/or group that includes a group of members. Examples of entities include a school, a college, a university, a company, a club, a league, a team, and a department. As an example, members of a school include students, professors, and administrators of the school. As another example, members of a company include employees and directors of the company.

Users (such as users 126a-b) of an inter-entity communication engine 102 include members of different entities. A user that is a member of a particular entity may be referred to as being "associated with" the particular entity. For example, as illustrated, users 126a are associated with the entity 106a. Users 126b are associated with the entity 106b.

In one or more embodiments, a content item (such as content items 128a-b) is a piece of content generated by one or more users. Examples of content items include a resume, a job posting, a user profile, and a forum posting. As an example, a student may upload or input a resume to a data repository that is accessible to an inter-entity communication engine. As another example, an administrator of a company may post a job posting on a website that is accessible to an inter-entity communication engine. As another example, a user may create a user profile that is used for accessing services provided by an inter-entity communication engine. As another example, a student may post a question regarding a particular subject area on an online forum that is accessible to an inter-entity communication engine. Another student may post an answer to the question on the same online forum.

Content items accessible to an inter-entity communication engine 102 include content items generated by users associated with different entities. For example, as illustrated, content items 128a are generated by users 126a associated with the entity 106a. Content items 128b are generated by users 126b associated with the entity 106b.

In one or more embodiments, a data repository 104 is any type of storage unit and/or device (e.g., a file system, database, collection of tables, or any other storage mechanism) for storing data. Further, a data repository 104 may include multiple different storage units and/or devices. The multiple different storage units and/or devices may or may not be of the same type or located at the same physical site. Further, a data repository 104 may be implemented or may execute on the same computing system as an inter-entity communication engine 102. Alternatively or additionally, a data repository 104 may be implemented or executed on a computing system separate from an inter-entity communication engine 102. A data repository 104 may be communicatively coupled to an inter-entity communication engine 102 via a direct connection or via a network.

Information describing entity-specific parameters 116a-b, master parameters 140, mappings 132, and a relationship graph 134 may be implemented across any of components within the system 100. However, this information is illustrated within the data repository 104 for purposes of clarity and explanation.

In one or more embodiments, an entity-specific parameter (such as entity-specific parameters 116a-b) is a term (or set of terms) that is commonly recognized, adopted, and/or used by members of an entity to reference a particular topic. Additionally or alternatively, an entity-specific parameter is a term (or set of terms) that is established, determined, and/or chosen by an entity to reference a particular topic.

In an embodiment, an entity establishes the use of a particular entity-specific parameter to refer to a particular topic by using the particular entity-specific parameter in an official public manner.

Using an entity-specific parameter in an official public manner may include using the entity-specific parameter in an official publication. The official publication may be circulated amongst members of the entity and/or the general public. As an example, Cornell University may publish a roster of areas of study offered by the university. The roster may use the term "Electrical and Computer Engineering" in referring to the study of electricity, electronics, and electromagnetism. Students of Cornell University may use the roster when selecting a major and/or enrolling in a course. By publishing the term "Electrical and Computer Engineering," Cornell University establishes the use of the term in referring to the study of electricity, electronics, and electromagnetism.

As another example, Cornell University may provide business cards for faculty members. A business card of a professor may identify the department that the professor belongs to. Professors in a department that focuses on the study of electricity, electronics, and electromagnetism may have business cards including the term "Electrical and Computer Engineering." The business cards may indicate that the professors belong to the "Electrical and Computer Engineering" department. By using the term "Electrical and Computer Engineering" on the business cards, Cornell University establishes the use of the term in referring to the department that focuses on the study of electricity, electronics, and electromagnetism.

As another example, Cornell University may provide diplomas to graduating students. A diploma of a student who studied electricity, electronics, and electromagnetism may include the term "Electrical and Computer Engineering." The diploma may indicate that the student majored and/or minored in "Electrical and Computer Engineering." By using the term "Electrical and Computer Engineering" on the diplomas, Cornell University establishes the use of the term in referring to the study of electricity, electronics, and electromagnetism.

As another example, a company may post job postings on an internal and/or external website. A particular job opening may require a person who studied the design and use of computers. A job posting for the particular job may state that a Bachelor degree in "Computer Science" is required. By using the term "Computer Science" in the job posting, the company establishes the use of the term in referring to the study of the design and use of computers.

Using an entity-specific parameter in an official public manner may include using the entity-specific parameter in a public signage and/or public display. As an example, Cornell University may include a building designated for a particular department. The particular department may focus on the study of electricity, electronics, and electromagnetism. Cornell University may request and/or authorize the installment of a signage including the term "Electrical and Computer Engineering" on the building. By installing the signage including the term "Electrical and Computer Engineering," Cornell University establishes the use of the term in referring to the department that focuses on the study of electricity, electronics, and electromagnetism.

Different entities may use different entity-specific parameters to reference similar topics. Examples of topics referenced by an entity-specific parameter include but are not limited to an area of study, a major, a minor, a subject area, a course, a class, a laboratory, a seminar, a lecture, a department, a skill, and a school.

As an example, an area of study may be electricity, electronics, and electromagnetism. The area of study may be offered at Cornell University and the Massachusetts Institute of Technology (MIT). Cornell University may refer to the area of study as "Electrical and Computer Engineering." MIT may refer to the area of study as "Electrical Engineering and Computer Science." "Electrical and Computer Engineering" is an entity-specific parameter associated with Cornell University. "Electrical Engineering & Computer Science" is an entity-specific parameter associated with MIT.

As another example, a particular course may be an introductory study to circuits. The particular course may be offered at Cornell University and MIT. Cornell University may provide the title "Introduction to Circuits" for the particular course. Cornell University may use the course code "ECE 2100" to refer to the particular course. MIT may provide the title "Circuits and Electronics" to the particular course. MIT may use the course code "6.002" to refer to the particular course. "Introduction to Circuits" and "ECE 2100" are entity-specific parameters associated with Cornell University. "Circuits and Electronics" and "6.002" are entity-specific parameters associated with MIT.

In an embodiment, each entity is associated with a set of entity-specific parameters. Each set of entity-specific parameters, associated with different entities, may refer to similar topics and/or different topics. Each set of entity-specific parameters, associated with different entities, may be in the same language and/or different languages. As an example, each set of entity-specific parameters may use different terms, in the same language, to refer to similar topics. For example, as illustrated, the entity 106a is associated with entity-specific parameters 116a. The entity 106b is associated with entity-specific parameters 116b.

As an example, a set of entity-specific parameters associated with Cornell University may include "Electrical and Computer Engineering" and "Biological and Environmental Engineering." A set of entity-specific parameters associated with MIT may include "Electrical Engineering & Computer Science" and "Biological Engineering." In this example, each entity is associated with a different set of entity-specific parameters. The sets of entity-specific parameters are in the same language, English. Further, the sets of entity-specific parameters refer to similar topics: (a) the study of electricity, electronics, and electromagnetism and (b) the study of biology as applied to real-world problems.

In an embodiment, a set of entity-specific parameters, associated with a particular entity, are downloaded and/or obtained from the particular entity. The set of entity-specific parameters may be updated periodically, and/or in response to any changes made by the particular entity. As an example, a set of entity-specific parameters, associated with a particular entity, are downloaded from a website published by the particular entity. As another example, a set of entity-specific parameters, associated with a particular entity, are entered into the data repository 104 by a user after receiving the set of entity-specific parameters from the particular entity.

In one or more embodiments, a master parameter (such as master parameters 140) is a term (or set of terms) that is used by an inter-entity communication engine 102 to reference a particular topic. An inter-entity communication engine 102 uses a master parameter as an intermediate term to facilitate comparisons of content items generated by users of different entities. Entity-specific parameters, included in the content items generated by users of different entities, are mapped to a same set of master parameters 140. The set of master parameters 140 serve as a "common set of terminology" to which entity-specific parameters of different entities may be mapped.

A master parameter referring to a particular topic may be the same as an entity-specific parameter, associated with a particular entity, that refers to the same particular topic. Alternatively, a master parameter referring to a particular topic may be different from all entity-specific parameters, associated with any entity, that refer to the same particular topic.

In one or more embodiments, a mapping 132 between an entity-specific parameter and a master parameter indicates a level of association between the entity-specific parameter and the master parameter. The entity-specific parameter may be referred to as being "mapped to" and/or "corresponding to" the master parameter. The level of association may be represented in a particular scale. As an example, a level of association may be represented as a two-decimal-place number on a scale of 0 to 1. The number 0 indicates no association, and the number 1 indicates the highest level of association. Hence, a level of association may be, for example, 0.24, 0.48, or 0.73. As another example, a level of association may be either a 0 or a 1. The number 0 indicates that there is no association, and the number 1 indicates that there is an association.

Each of the entity-specific parameters, associated with various entities, is mapped to one or more master parameters. Each master parameter is mapped to one or more entity-specific parameters. Hence, there may be a many-to-many mapping between the entity-specific parameters and the master parameters.

As an example, entity-specific parameters associated with Cornell University may include "Mechanical Engineering" and "Aerospace Engineering." Entity-specific parameters associated with MIT may include "Mechanical Engineering" and "Ocean Engineering." Master parameters may include "Engineering" and "Mechanical Engineering." Mappings may indicate that the entity-specific parameters associated with Cornell University, "Mechanical Engineering" and "Aerospace Engineering," correspond to the master parameter, "Mechanical Engineering." Mappings may further indicate the entity-specific parameters associated with MIT, "Mechanical Engineering" and "Ocean Engineering," correspond to the master parameter, "Mechanical Engineering." Additionally, mappings may indicate that the entity-specific parameter associated with Cornell University, "Mechanical Engineering," correspond to the master parameters, "Engineering" and "Mechanical Engineering." As illustrated in this example, there is a many-to-many mapping between the entity-specific parameters and master parameters.

As another example, an entity-specific parameters associated with Cornell University may be "Electrical and Computer Engineering." Master parameters may include "Electrical Engineering" and "Computer Engineering." Mappings may indicate that the entity-specific parameter "Electrical and Computer Engineering" corresponds to the master parameters, "Electrical Engineering" and "Computer Engineering." In this example, a single entity-specific parameter is mapped to multiple master parameters.

Mappings 132 may be stored in any format. As an example, mappings may be stored as a table. The columns of the table include (a) an entity-specific parameter, (b) a master parameter, and (c) a level of association between the entity-specific parameter and the master parameter. An entity-specific parameter may be "Electrical and Computer Engineering." A master parameter may be "Electrical Engineering." One row of the table may include, for example, "Electrical and Computer Engineering; Electrical Engineering; 0.9." This row indicates a mapping between "Electrical and Computer Engineering" and "Electrical Engineering." This row indicates that a level of association between the entity-specific parameter "Electrical and Computer Engineering" and the master parameter "Electrical Engineering" is "0.9."

Figure 2:
FIG. 2 illustrates an example of a relationship graph of master parameters, in accordance with one or more embodiments.
Figure 2:
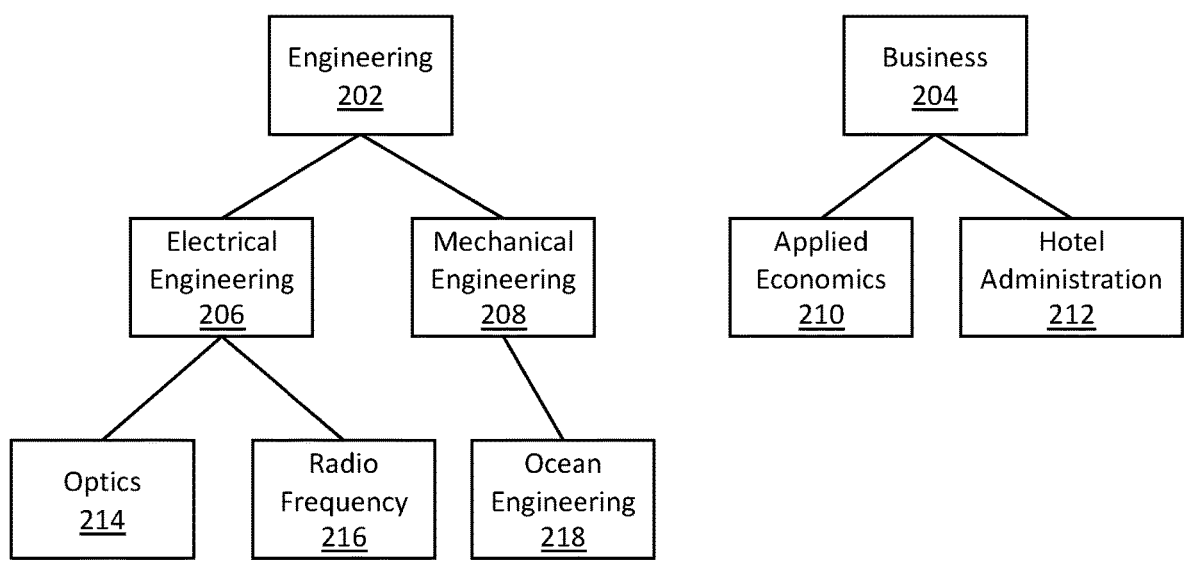

In one or more embodiments, a relationship graph 134 indicates relationships between master parameters 140. Referring to FIG. 2, FIG. 2 illustrates an example of a relationship graph. A relationship graph 200 includes various nodes. The nodes include engineering 202, business 204, electrical engineering 206, mechanical engineering 208, applied economics 210, hotel administration 212, optics 214, radio frequency 216, and ocean engineering 218.

The relationship graph 200 may include one or more tree graphs and/or other graphical representations. Each node branches into one or more other nodes. As illustrated, engineering 202 branches into electrical engineering 206 and mechanical engineering 208. Electrical engineering 206 branches into optics 214 and radio frequency 216. Mechanical engineering 208 branches into ocean engineering 218. Business 204 branches into applied economics 210 and hotel administration 212.

The term "proximity" between two nodes refers to a type of relationship between the two nodes. Types of relationships may include, for example, parent-child, grandparent-grandchild, ancestor-descendant, siblings, and cousins.

A particular node that directly branches into another node may be referred to as a "parent" of the other node. Conversely, the other node may be referred to as a "child" of the particular node. As illustrated, for example, engineering 202 is a parent of electrical engineering 206 and mechanical engineering 208. Optics 214 is a child of electrical engineering 206.

Extending the above terminology, a particular node that indirectly branches into another node may be referred as an "ancestor" of the other node. Conversely, the other node may be referred to a "descendant" of the particular node. As a specific example, engineering 202 is a grandparent of optics 214. Radio frequency 216 is a grandchild of engineering 202. Other relationships, such as great-grandparent and great-great-grandparent may be included in a relationship graph as well.

Two nodes that share a same parent may be referred to as "siblings." As illustrated, for example, applied economics 210 is a sibling of hotel administration 212. Further, two nodes that share a same grandparent may be referred to as "cousins." As illustrated, for example, optics 214 is a cousin of ocean engineering 218.

In one or more embodiments, an inter-entity communication engine 102 refers to hardware and/or software configured to perform operations described herein for (a) generating a mapping between an entity-specific parameter and a master parameter, and/or (b) returning content items associated with a particular master parameter. Examples of operations for generating a mapping between an entity-specific parameter and a master parameter are described below with reference to FIG. 3. Examples of operations for returning content items associated with a particular master parameter are described below with reference to FIGS. 4-6.

In an embodiment, an inter-entity communication engine 102 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a mainframe, a television, a content receiver, a set-top box, a printer, a mobile handset, a smartphone, a personal digital assistant ("PDA").

Figure 3:
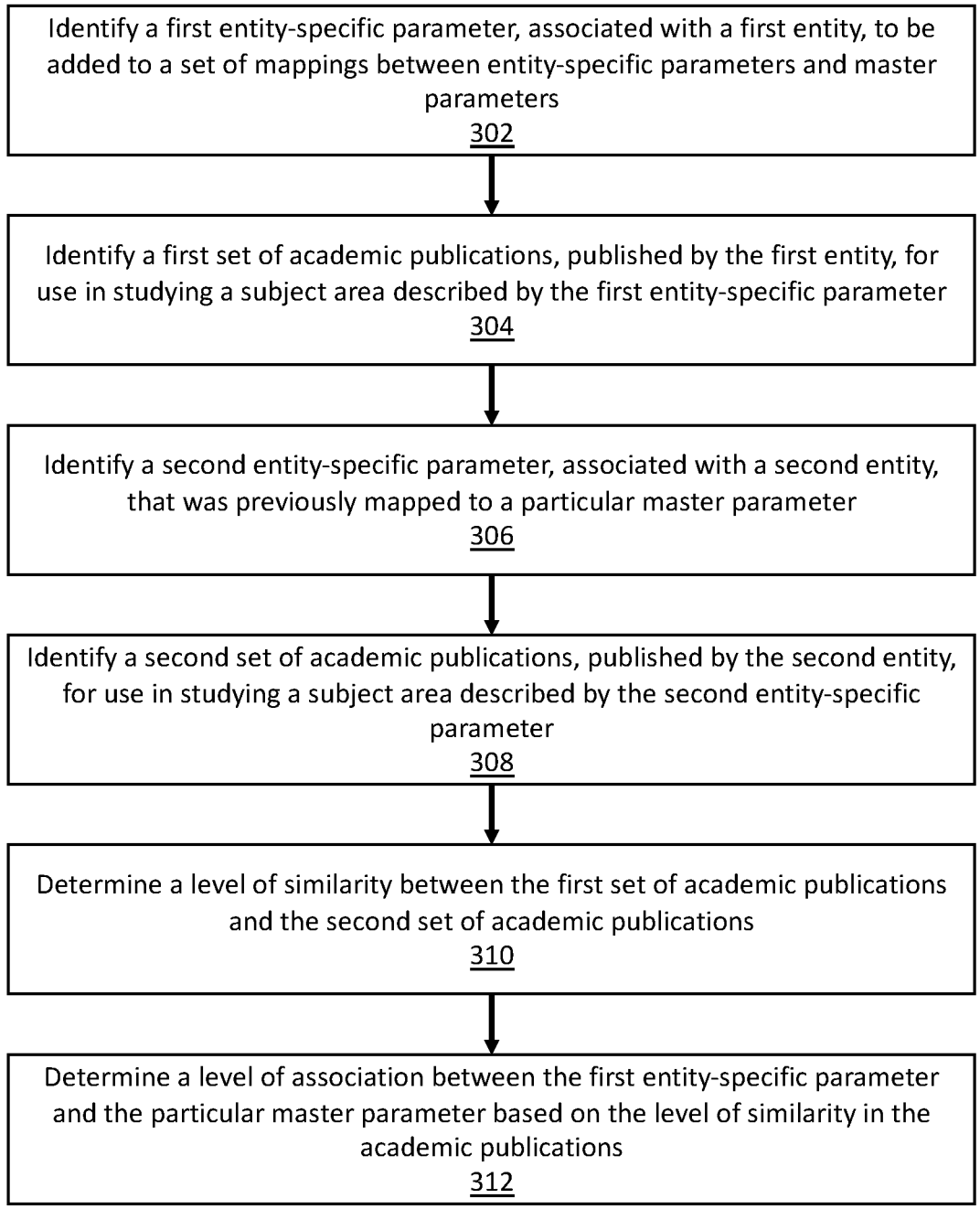
FIG. 3 illustrates an example set of operations for generating a mapping between an entity-specific parameter and a master parameter, in accordance with one or more embodiments.

3. Generating a Mapping Between an Entity-Specific Parameter and a Master Parameter FIG. 3 illustrates an example set of operations for generating a mapping between an entity-specific parameter and a master parameter, in accordance with one or more embodiments. One or more operations illustrated in FIG. 3 may be modified, rearranged, or omitted all together. Accordingly, the particular sequence of operations illustrated in FIG. 3 should not be construed as limiting the scope of one or more embodiments.

One or more embodiments include identifying a first entity-specific parameter, associated with a first entity, to be added to a set of mappings between entity-specific parameters and master parameters (Operation 302). In an embodiment, an inter-entity communication engine obtains the first entity-specific parameter.

As an example, Cornell University may publish a website on the academic programs offered by the university. The academic programs may include "Architecture, Art, and Planning." The term may be used to refer to the study of architecture, fine arts, and city and regional planning. The inter-entity communication engine may scrape and/or extract the information from the website. The inter-entity communication engine may identify, from the website, the term "Architecture, Art, and Planning" as an entity-specific parameter associated with Cornell University.

As another example, MIT may include a building for a particular department that focuses on the study of analytical methods to optimize systems and/or decision-making. A signage installed on the building may state, "Operations Research and Statistics." An inter-entity communication engine may obtain a photo of the building. The inter-entity communication engine may determine, based on the photo, that the signage on the building states, "Operations Research and Statistics." The inter-entity communication engine may identify the term "Operations Research and Statistics" as an entity-specific parameter associated with MIT.

As another example, a particular company may post a job posting on a website. The job posting may state that a candidate must have a degree in "Electrical Engineering." An inter-entity communication engine may identify, from the website, the term "Electrical Engineering" as an entity-specific parameter associated with the particular company.

In an embodiment, the inter-entity communication engine obtains the first entity-specific parameter via user input entered by a member of the first entity. As an example, an inter-entity communication engine may render a user-interface for entering entity-specific parameters. An administrator of a particular college may enter, upload, and/or import a list of courses offered by the college. The list may include "Computer Architecture." The inter-entity communication may identify the term "Computer Architecture" as an entity-specific parameter associated with the particular college.

Additional and/or alternative methods for obtaining the first entity-specific parameter may be used.

One or more embodiments include identifying a first set of academic publications, published by the first entity, for use in studying a subject area described by the first-entity specific parameter (Operation 304). Academic publications may be published by a university, a college, a department, a school, a professor, and/or a teaching assistant. Academic publications are used by students to study a subject area described by the first-entity parameter. Students may use academic publications, for example, to select an area of study, to select and enroll in a course, to learn topics of a course, to prepare for a course, and/or to complete a course. Academic publications may include physical publications (such as a magazine, a journal, or a book) and/or electronic publications (such as a website). Specific examples of academic publications include but are not limited to a course roster, a course syllabus, a presentation and/or slideshow, examination, course material, lecture notes, and/or homework questions.

As an example, an entity-specific parameter may be a title of a particular course, "Introduction to Chemistry." Academic publications for use in studying the subject area of the particular course include a course syllabus provided by a professor, presentations drafted by the professor, and laboratory projects given by the professor.

As another example, an entity-specific parameter may describe an academic program, "Electrical and Computer Engineering." Academic publications for use in studying the subject area include course syllabi of any courses offered under the academic program, and a course roster describing courses offered under the academic program.

In an embodiment, an academic institution and/or a member thereof makes available the set of academic publications. The academic publications are available for students to download, purchase, and/or otherwise obtain. The academic publications are made available via a website, networked server, and/or otherwise accessible source. The inter-entity communication engine obtains the set of academic publications from the website, networked server, and/or otherwise accessible source. As an example, an inter-entity communication engine may download academic publications offered on a course website.

In an embodiment, the inter-entity communication engine obtains the set of academic publications via user-input. The user input may be entered by a member of an academic institution, such as an administrator, a faculty member, a teaching assistant, and/or a student.

Additional and/or alternative methods for identifying the first set of academic publications may be used.

One or more embodiments include identifying a second entity-specific parameter, associated with a second entity, that was previously mapped to a particular master parameter (Operation 306). The inter-entity communication engine retrieves a set of mappings, between entity-specific parameters and master parameters, from a data repository. The inter-entity communication engine identifies, from the set of mappings, a mapping between the second entity-specific parameter and the particular master parameter.

One or more embodiments include identifying a second set of academic publications, published by the second entity, for use in studying a subject area described by the second entity-specific parameter (Operation 308). Descriptions relating to identifying academic publications are discussed above with reference to Operation 304. The inter-entity communication engine may have identified the second set of academic publications at the time that the second entity-specific parameter was mapped to the particular master parameter. Additionally or alternatively, the inter-entity communication engine may identify the second set of academic publications after determining that the first entity-specific parameter is to be added to the set of mappings at Operation 302.

One or more embodiments include determining a level of similarity between the first set of academic publications and the second set of academic publications (Operation 310). The inter-entity communication engine compares the first set of academic publications and the second set of academic publications. The inter-entity communication engine may use any number of well-known methods for comparing documents, such as term frequency-inverse document frequency (tf-idf), a semantic similarity, n-grams, eigenvector or eigenvalue decomposition, neural networks, deep neural networks, pattern recognition, pattern analysis, natural language processing, and/or a cosine similarity.

In an embodiment, the inter-entity communication engine may identify multiple entity-specific parameters, associated with different entities, that were previously mapped to the particular master parameter. The inter-entity communication engine may identify academic publications, published by the different entities, for studying the subject areas described by the entity-specific parameters that were previously mapped to the particular master parameter. The inter-entity communication engine may determine a level of similarity between the first set of academic publications and the academic publications published by the different entities.

As an example, an entity-specific parameter associated with Cornell University may be a title of a particular course, "New Testament and Early Christian Literature." A set of mappings, stored at a data repository of an inter-entity communication engine, may include a mapping for a particular master parameter, "Christianity." Entity-specific parameters previously mapped to the particular master parameter include: (a) "Hebrew Bible," offered by University of Pennsylvania, and (b) "Introduction to Christian History," offered by Carnegie Mellon University. The inter-entity communication engine identifies academic publications associated with the course "Hebrew Bible" and the course "Introduction to Christian History." The inter-entity communication compares these academic publications to the academic publications associated with the course "New Testament and Early Christian Literature." The inter-entity communication engine may determine a level of similarity between (a) the academic publications associated with the course "Hebrew Bible" and/or "Introduction to Christian History" and (b) the academic publications associated with the course "New Testament and Early Christian Literature." Based on tf-idf, or other document comparison methods, the inter-entity communication engine determine that the level of similarity is 0.5.

One or more embodiments include determining a level of association between the first entity-specific parameter and the particular master parameter based on the level of similarity in the academic publications (Operation 312). In an embodiment, the inter-entity communication engine determines that the level of association between the first entity-specific parameter and the particular master parameter equals the level of similarity in the academic publications.

In an embodiment, the inter-entity communication engine scales and/or adjusts the level of similarity in the academic publications based on various factors. As an example, the level of similarity between the first set of academic publications and the second set of academic publications may be scaled and/or adjusted based on the number of academic publications in the first set of academic publications, and/or the number of academic publications in the second set of academic publications. The inter-entity communication engine determines that the level of association between the first entity-specific parameter and the particular master parameter is the scaled and/or adjusted level of similarity.

In an embodiment, multiple entity-specific parameters, including the second entity-specific parameter, were previously mapped to the particular master parameter. Academic publications associated with each of the entity-specific parameters may be identified. The inter-entity communication engine determines a level of similarity between the academic publications associated with each of the entity-specific parameters. The inter-entity communication engine determines a level of similarity between the first set of academic publications and the second set of academic publications, as described above. The inter-entity communication engine scales and/or adjusts the level of similarity between the first set of academic publications and the second set of academic publications based on the level of similarity between the academic publications associated with each of the entity-specific parameters previously mapped to the particular master parameter. The inter-entity communication engine determines that the level of association between the first entity-specific parameter and the particular master parameter is the scaled and/or adjusted level of similarity.

In an embodiment, the inter-entity communication engine determines a level of similarity between the first entity-specific parameter and the particular master parameter. Additionally or alternatively, the inter-entity communication engine determines a level of similarity between the first entity-specific parameter and the second entity-specific parameter. The inter-entity communication engine determines a level of similarity between two parameters by comparing the terms included in the two parameters. The inter-entity communication engine may use any number of well-known methods for comparing terms, such as term frequency-inverse document frequency (tf-idf), a semantic similarity, n-grams, eigenvector or eigenvalue decomposition, neural networks, deep neural networks, pattern recognition, pattern analysis, natural language processing, and/or a cosine similarity.

As an example, a course offered by MIT may be "Financial Models." A course offered by the University of Saskatchewan may be "Financial Analysis." An inter-entity communication engine may compare the terms "Financial Models" and "Financial Analysis." The inter-entity communication engine may determine that "Financial" is used in both terms. The inter-entity communication engine may determine that "Models" and "Analysis" have related meanings. Based on these determinations, the inter-entity communication engine may determine a level of similarity between the parameters "Financial Models" and "Financial Analysis."

The inter-entity communication engine determines a level of association between the first entity-specific parameter and the particular master parameter based on (a) the level of similarity between the first entity-specific parameter and the particular master parameter, (b) the level of similarity between the first entity-specific parameter and the second entity-specific parameter, and/or (c) the level of similarity between the first set of academic publications and the second set of academic publications.

In addition to or as an alternative to the operations described with reference to FIG. 3, other methods for generating a mapping between an entity-specific parameter and a master parameter may be used. Other methods for generating a mapping between an entity-specific parameter and a master parameter do not necessarily rely on academic publications. Various examples are described below.

In an embodiment, the inter-entity communication engine renders a user interface for accepting user input that maps entity-specific parameters to master parameters. As an example, a user may upload a table including mappings between entity-specific parameters and master parameters to an inter-entity communication engine. As another example, a user may store mappings between entity-specific parameters and master parameters at a data repository coupled to an inter-entity communication engine.

In an embodiment, the inter-entity communications engine requests user confirmation of previously-determined mappings. The inter-entity communication engine may request user confirmation regarding an entity-specific parameter associated with a particular entity only from users associated with the particular entity. User confirmation regarding a mapping between a particular entity-specific parameter and a particular master parameter are used to adjust a level of association between the particular entity-specific parameter and the particular master parameter. As an example, "Electrical and Computer Engineering" may be an academic program offered by Cornell University. A previously-determined mapping may indicate that a level of association between "Electrical and Computer Engineering" and "Electrical Engineering" is 0.90. An inter-entity communication engine may present a prompt to a student of Cornell University. The prompt may request the student to confirm whether "Electrical and Computer Engineering" corresponds to "Electrical Engineering." The student may confirm the mapping. Based on the confirmation, the inter-entity communication engine may increase the level of association from 0.90 to 0.95.

4. Returning Content Items Associated with a Particular Master Parameter

Figure 4:
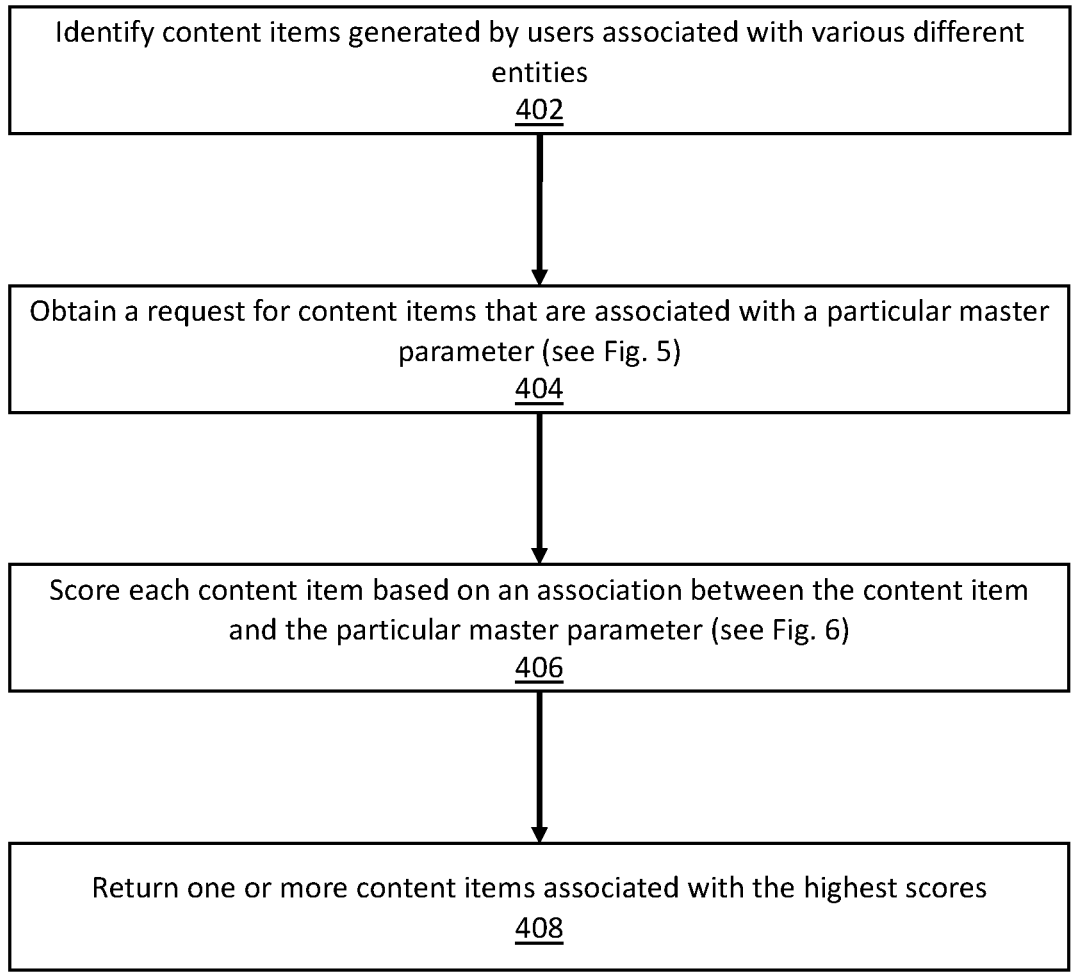
FIG. 4 illustrates an example set of operations for returning content items associated with a particular master parameter, in accordance with one or more embodiments.

FIG. 4 illustrates an example set of operations for returning content items associated with a particular master parameter, in accordance with one or more embodiments. One or more operations illustrated in FIG. 4 may be modified, rearranged, or omitted all together. Accordingly, the particular sequence of operations illustrated in FIG. 4 should not be construed as limiting the scope of one or more embodiments.

One or more embodiments include identifying content items generated by users associated with various different entities (Operation 402). As described above with reference to content items 128a-b of FIG. 1, examples of content items include resumes, job postings, user profiles, and forum postings.

In an embodiment, an inter-entity communication engine renders a user interface for receiving the content items. Each user has a user account managed by the inter-entity communication engine. Each user logs into his user account to submit one or more content items to the inter-entity communication engine.

As an example, a student of Stanford University may create a user account for accessing an inter-entity communication engine. The inter-entity communication engine may collect personal information of the student via a user interface, such as the student's name, email address, major, minor, and expected year of graduation. The personal information is compiled as a user profile of the student.

As another example, a user may login into a user account managed by an inter-entity communication engine. Based on user information associated with the user account, the inter-entity communication engine may identify the user as a graduate of Santa Clara University. The user may upload or input a resume through a user interface rendered by the inter-entity communication engine, using the user account. The inter-entity communication engine may identify the resume as a content item generated by a user associated with Santa Clara University.

As another example, a student may post a forum posting to an online forum hosted by an inter-entity communication engine. Based on user information associated with a user account of the student, the inter-entity communication engine may identify the student as being associated with MIT. The inter-entity communication engine may identify the forum posting as a content item generated by a user associated with MIT.

In an embodiment, an inter-entity communication engine renders a user interface for receiving the content items. Users need not log into user accounts to submit content items to the inter-entity communication engine. The inter-entity communication engine determines an entity associated with a user generating a content item based on the content included in the content item.

As an example, an administrator of a company may post a job posting on a job forum hosted by an inter-entity communication engine. The job posting may include a heading that states "Company ABC" and may include a logo of Company ABC. Based on the text and logo in the job posting, the inter-entity communication engine may determine that the job posting is a content item generated by a user associated with Company ABC.

In an embodiment, the inter-entity communication engine identifies the content items from websites and/or networked servers hosted by third parties. The inter-entity communication engine may scrape the websites of third parties to obtain the content items. Additionally or alternatively, the inter-entity communication engine may extract the content items from servers of third parties. The inter-entity communication engine may determine that the content items are generated by one or more users of a particular entity based on the particular entity hosting the website and/or server. Additionally or alternatively, the inter-entity communication engine may determine that the content items are generated by one or more users of a particular entity based on the content included in the content items.

One or more embodiments include obtaining a request for content items that are associated with a particular master parameter (Operation 404). The inter-entity communication engine receives and/or generates the request for the content items that are associated with the particular master parameter. The request for the content items that are associated with the particular master parameter may be obtained based on a query, a content item, and/or another user input that includes the particular master parameter. Additionally or alternatively, the request for the content items that are associated with the particular master parameter may be derived from a query, a content item, and/or another user input that includes an entity-specific parameter.

In an embodiment, the inter-entity communication engine receives a query via a user interface. A query is a search phrase and/or search criteria entered by a user via a user interface. The query includes the particular master parameter as a query term. The query is for content items associated with the particular master parameter. As an example, a master parameter may be "Electrical Engineering." An inter-entity communication engine may render a user interface including a query box. The query box may include a dropdown menu for selecting an academic program. The options provided are the master parameters, including "Electrical Engineering." A user may create a query, selecting the "Electrical Engineering" option from the dropdown menu.

The inter-entity communication engine may receive the query from the user interface.

In an embodiment, the inter-entity communication engine receives a query via a user interface. The query uses an entity-specific parameter associated with the particular entity as a query term. The query, received from a user associated with a particular entity, is for content items that are associated with the entity-specific parameter associated with the particular entity. The inter-entity communication engine maps the entity-specific parameter to the particular master parameter. Based on the query entered by the user, the inter-entity communication engine generates the request for content items associated with the particular master parameter. As an example, a student majoring in linguistics at Santa Clara University may desire to find students majoring in linguistics at different universities. Santa Clara University may use the term "Modern Languages and Literatures" to refer to the study of linguistics. An inter-entity communication engine may render a user interface including a query box. The query box may include a text field for accepting queries. The Santa Clara University student may type "Modern Languages and Literatures" into the text field. The inter-entity communication engine may receive the query from the user interface. The inter-entity communication engine may look up a set of mappings between entity-specific parameters and master parameters. Based on the set of mappings, the inter-entity communication engine may determine that a master parameter with the highest level of association with "Modern Languages and Literatures" is "Linguistics." The inter-entity communication engine may generate a request for content items associated with "Linguistics." The request for content items associated with "Linguistics" includes (a) a request for content items including the master parameter "Linguistics" and (b) a request for content items including an entity-specific parameter mapped to "Linguistics."

In an embodiment, the inter-entity communication engine generates the request for content items associated with the particular master parameter based on a particular content item. As an example, an administrator of a company may post a job posting. The job posting may state that candidates must possess a degree in "Biological Engineering." An inter-entity communication engine may generate a request for resumes associated with "Biological Engineering" based on the job posting. In this example, the job posting is a particular content item from which a request for other content items is generated. Further details regarding generating a request for content items associated with a particular master parameter based on a particular content item are described with reference with FIG. 5.

Figure 5:
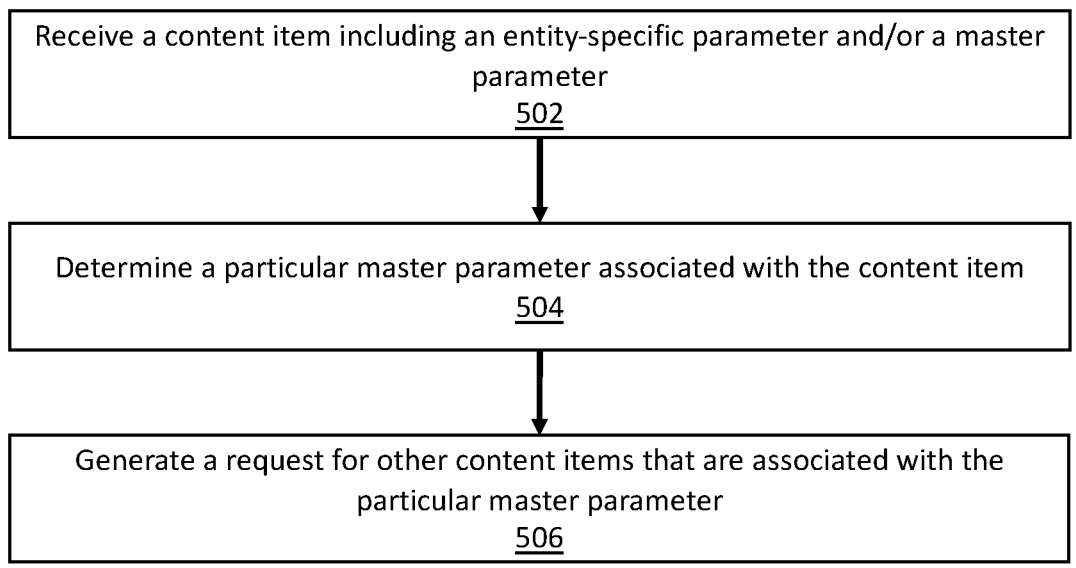
FIG. 5 illustrates an example set of operations for generating a request for content items associated with a particular master parameter, in accordance with one or more embodiments.

Referring to FIG. 5, one or more embodiments include receiving a content item including an entity-specific parameter and/or a master parameter (Operation 502). An inter-entity communication engine renders a user interface for receiving content items. A user may upload and/or otherwise submit a content item via the user interface. As an example, an administrator of a company may submit a job posting to an inter-entity communication engine. As another example, a student may submit a resume to an inter-entity communication engine.

One or more embodiments include determining a particular master parameter associated with the content item (Operation 504). The inter-entity communication engine parses the content item to identify entity-specific parameters and/or master parameters included in the content item.

The inter-entity communication engine identifies a particular entity associated with the submitter of the content item. The inter-entity communication engine identifies a set of entity-specific parameters associated with the particular entity. The inter-entity communication engine compares the content item with (a) the set of entity-specific parameters and/or (b) the master parameters.

The comparison may be performed in a context-independent manner. If any of the set of entity-specific parameters and/or any of the master parameters appear in the content item, then the inter-entity communication engine determines that a match is found.

The comparison may be performed in a context-dependent manner. If any of the set of entity-specific parameters and/or any of the master parameters appear in a specific context in the content item, then the inter-entity communication engine determines that a match is found. As an example, an entity-specific parameter may be, "Communications," referring to the area of study in communications. A content item may be a job posting. The job posting may list various requirements of a job candidate, including "Good communications skills." An inter-entity communication engine may determine a context in which the word "communications" appears in the job posting. The inter-entity communication engine may determine that the word "communications" in the job posting is not referring to an area of study. Based on the context, the inter-entity communication engine may determine that there is no match between (a) the word "communications" in the job posting and (b) the entity-specific parameter "Communications."

If there is a match with a master parameter, then the inter-entity communication engine determines that the content item is associated with the master parameter.

Additionally or alternatively, if there is a match with an entity-specific parameter, then the inter-entity communication engine determines that the content item is associated with the entity-specific parameter. The inter-entity communication engine determines a master parameter that has been mapped to the entity-specific parameter. The inter-entity communication engine determines that the content item is further associated with the master parameter.

As an example, an inter-entity communication engine may identify a portion of a resume that specifies a major of a job applicant. The portion of the resume that specifies the major may be a portion following the word "Major" included in the resume. Alternatively, The portion of the resume that specifies the major may be a portion following the listing of the university of the job applicant. The inter-entity communication engine may identify the words included in the identified portion.

The inter-entity communication engine may determine whether the words included in the identified portion match any master parameter. If there is a match with a master parameter, then the inter-entity communication engine may determine that the content item is associated with the master parameter.

Additionally or alternatively, the inter-entity communication engine may determine a particular university associated with the job applicant. The inter-entity communication engine may identify a set of entity-specific parameters associated with the particular university. The inter-entity communication engine may determine whether the words included in the identified portion match any of the set of entity-specific parameters. If there is a match with an entity-specific parameter, then the inter-entity communication engine may determine that the content item is associated with the entity-specific parameter. The inter-entity communication engine may determine a master parameter that has been mapped to the entity-specific parameter. The inter-entity communication engine may determine that the content item is further associated with the master parameter.

One or more embodiments include generating a request for other content items that are associated with the particular master parameter (Operation 506). The inter-entity communication engine uses the particular master parameter identified at Operation 504 to generate a request for other content items. The type of content item being searched may be the same as or different from the type of content item that was used to generate the search.

As described in an example above, an administrator of a company may post a job posting. The job posting may state that candidates must possess a degree in "Biological Engineering." An inter-entity communication engine may generate a request for resumes associated with "Biological Engineering" based on the job posting. The company may find suitable candidates for the job opening based on results of the search. In this example, the type of content items being searched (resumes) is different from the type of content item that was used to generate the search (job postings).

As another example, a student may post a resume. The resume may list that the student majors in "Biological Engineering." An inter-entity communication engine may generate a request for job postings associated with "Biological Engineering" based on the resume. The student may find suitable job openings based on results of the search. In this example, the type of content items being searched (job postings) is different from the type of content item that was used to generate the search (resumes).

As another example, a student may generate a particular user profile. The user profile may indicate that the student majors in "Biological Engineering." An inter-entity communication engine may generate a request for other user profiles associated with "Biological Engineering" based on the particular user profile. The student may connect with other students of the same major based on results of the search. In this example, the type of content items being searched is the same as the type of content item that was used to generate the search (user profiles).

Additional and/or alternative methods for obtaining a request for content items associated with the particular master parameter may be used.

Referring back to FIG. 4, one or more embodiments include scoring each content item based on an association between the content item and the particular master parameter (Operation 406). An example set of operations for scoring a content item based on an association between the content item and a particular master parameter is described below with reference to FIG. 6.

Figure 6:
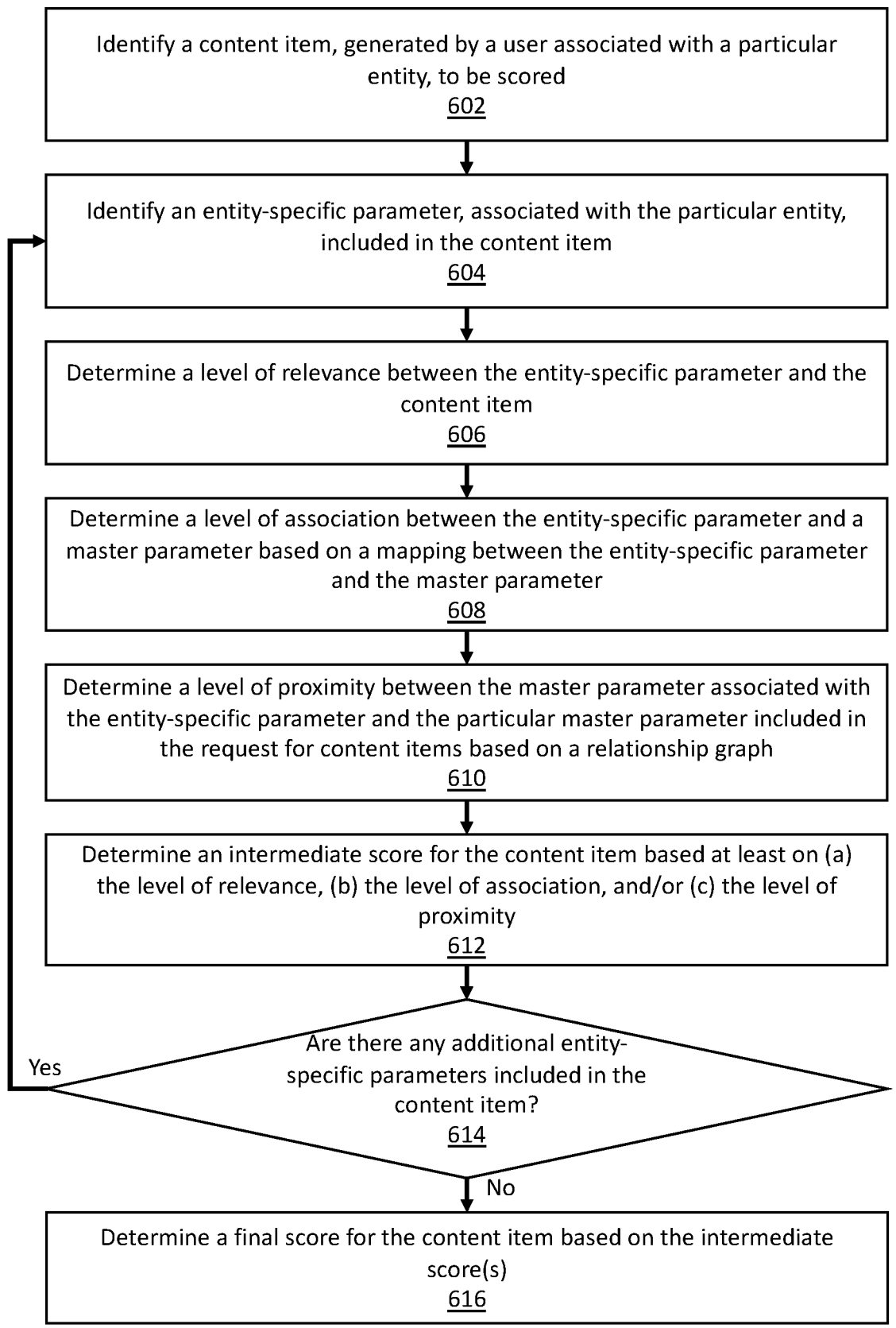
FIG. 6 illustrates an example set of operations for scoring a content item based on an association between the content item and a particular master parameter, in accordance with one or more embodiments.

Referring to FIG. 6, one or more embodiments include identifying a content item, generated by a user associated with a particular entity, to be scored (Operation 602). An inter-entity communication engine identifies a content item to be scored from the content items identified at Operation 402. The inter-entity communication engine identifies the particular entity associated with the user that generated the content item to be scored.

One or more embodiments include identifying an entity-specific parameter, associated with the particular entity, included in the content item (Operation 604). The inter-entity communication engine identifies a set of entity-specific parameters associated with the particular entity from a data repository coupled to the inter-entity communication engine. The inter-entity communication engine scans the content item to determine whether the content item includes any of the set of entity-specific parameters. The inter-entity communication engine identifies an entity-specific parameter included in the content item.

As an example, entity-specific parameters associated with Cornell University may include "Civil Engineering." Entity-specific parameters associated with MIT may include "Structural Engineering." An inter-entity communication engine may scan a resume posted by a member of Cornell University for the term "Civil Engineering," but not "Structural Engineering." Conversely, the inter-entity communication engine may scan a resume posted by a member of MIT for the term "Structural Engineering," but not "Civil Engineering."

One or more embodiments include determining a level of relevance between the entity-specific parameter and the content item (Operation 606). The inter-entity communication engine determines a level of relevance based on the usage of the entity-specific parameter in the content item. As an example, a level of relevance may be based on a number of times that the entity-specific parameter appears in the content item. As another example, a level of relevance may be based on a position at which the entity-specific parameter appears in the content item. If the entity-specific parameter appears in a heading section of the content item, then a higher level of relevance may be determined. If the entity-specific parameter appears in a body section of the content item, then a lower level of relevance may be determined. As another example, a level of relevance may be based on a context in which the entity-specific parameter appears in the content item. If the entity-specific parameter describes a major of a student, graduate, and/or job applicant, then a higher level of relevance may be determined. If the entity-specific parameter describes a minor of a student, graduate, and/or job applicant, then a lower level of relevance may be determined. If the entity-specific parameter describes a required skill of a job opening, then a higher level of relevance may be determined. If the entity-specific parameter describes a preferred skill of a job opening, then a lower level of relevance may be determined.

Additional and/or alternative methods for determining a level of relevance between the entity-specific parameter and the content item may be used.

One or more embodiments include determining a level of association between the entity-specific parameter and a master parameter based on a mapping between the entity-specific parameter and the master parameter (Operation 608). The inter-entity communication engine retrieves a set of mappings between entity-specific parameters and master parameters from a data repository. The inter-entity communication engine identifies a mapping for the entity-specific parameter identified at Operation 604. The mapping indicates a master parameter associated with the entity-specific parameter and a level of association between the entity-specific parameter and the master parameter.

One or more embodiments include determining a level of proximity between the master parameter associated with the entity-specific parameter and the particular master parameter included in the request for content items based on a relationship graph (Operation 610). The inter-entity communication engine retrieves a relationship graph from a data repository. The inter-entity communication engine identifies, in the relationship graph, (a) the master parameter associated with the entity-specific parameter and (b) the particular master parameter included in the request obtained at Operation 404. If the master parameter associated with the entity-specific parameter is the particular master parameter included in the request obtained at Operation 404, then the highest level of proximity is determined.

If the master parameter associated with the entity-specific parameter is not equal to the particular master parameter included in the request obtained at Operation 404, then the inter-entity communication engine determines a relationship type between the two master parameters based on the relationship graph. As described above with reference to FIG. 2, examples of relationships include a parent-child relationship, a grandparent-grandchild relationship, an ancestor-descendant relationship, a sibling relationship, and a cousin relationship. Each type of relationship corresponds to a level of proximity. As an example, the following is a list of relationship types ordered based on the corresponding level of proximity, ranging from highest to lowest level of proximity: a parent-child relationship, a sibling relationship, a grandparent-grandchild relationship, a cousin relationship, and an ancestor-descendant relationship.

One or more embodiments include determining an intermediate score for the content item based at least on (a) the level of relevance, (b) the level of association, and/or (c) the level of proximity (Operation 612). The inter-entity communication engine may determine the intermediate score in various ways. As an example, an inter-entity communication engine may compute a weighted sum of (a) the level of relevance, (b) the level of association, and/or (c) the level of proximity. As another example, an inter-entity communication engine may determine the intermediate score based on (a) the level of relevance, (b) the level of association, and/or (c) the level of proximity as well as additional factors.

In an embodiment, the inter-entity communication engine may determine that multiple mappings are associated with the entity-specific parameter identified at Operation 604. Each mapping is between (a) the entity-specific parameter identified at Operation 604 and (b) a different master parameter. For each of the master parameters associated with the entity-specific parameter identified at Operation 604, the inter-entity communication engine iterates Operations 608-612. The inter-entity communication engine determines multiple intermediate scores for the content item based on the same entity-specific parameter.

One or more embodiments include determining whether there are any additional entity-specific parameters included in the content item (Operation 614). If there is an additional entity-specific parameter, then the inter-entity communication engine iterates Operations 604-612 with respect to the additional entity-specific parameter. The inter-entity communication engine determines multiple intermediate scores for the content item based on different entity-specific parameters included in the content item.

One or more embodiments include determining a final score for the content item based on the intermediate score(s) (Operation 616). The final score is determined based on (a) one or more intermediate scores for the content item based on the same entity-specific parameter and/or (b) one or more intermediate scores for the content item based on different entity-specific parameters included in the content item. The inter-entity communication engine may determine the final score in various ways. As an example, an inter-entity communication engine may compute a weighted sum of the intermediate scores. As another example, an inter-entity communication engine may determine the final score based on the intermediate scores as well as additional factors.

The inter-entity communication engine performs Operations 602-616 with respect to each content item to be scored. Each content item is scored based on an association between the content item and the particular master parameter included in the request obtained at Operation 404. At the reiteration of Operation 604 with respect to different content items, the inter-entity communication engine retrieves a set of entity-specific parameters associated with different entities. The inter-entity communication engine retrieves a set of entity-specific parameters associated with the entity of the user that generated the content item to be scored. Different sets of entity-specific parameters are used for the same operation. At Operation 608, the different sets of entity-specific parameters are mapped to a same set of master parameters. Hence, content items that are generated by users of different entities and include different entity-specific parameters may be found to have an association with a same master parameter. By mapping the different entity-specific parameters to a same set of master parameters, the inter-entity communication engine facilitates communications across different entities.

Additional and/or alternative methods for scoring a content item based on an association between the content item and the particular master parameter may be used.

Referring back to FIG. 4, one or more embodiments include returning one or more content items associated with the highest scores (Operation 408). The inter-entity communication engine ranks the content items according to the scores calculated for the content items. The inter-entity communication engine returns one or more content items associated with the highest scores in response to the request obtained at Operation 404. The inter-entity communication engine may present the content items at a user interface. Additionally or alternatively, the inter-entity communication engine may transmit a notification regarding the content items.

In an embodiment, the inter-entity communication engine returns content items associated with scores that are higher than a specified threshold value. In other embodiments, the inter-entity communication engine selects content items to be returned in response to the request based on additional and/or alternative functions applied to the scores determined at Operation 406.

5. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

6. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 7:
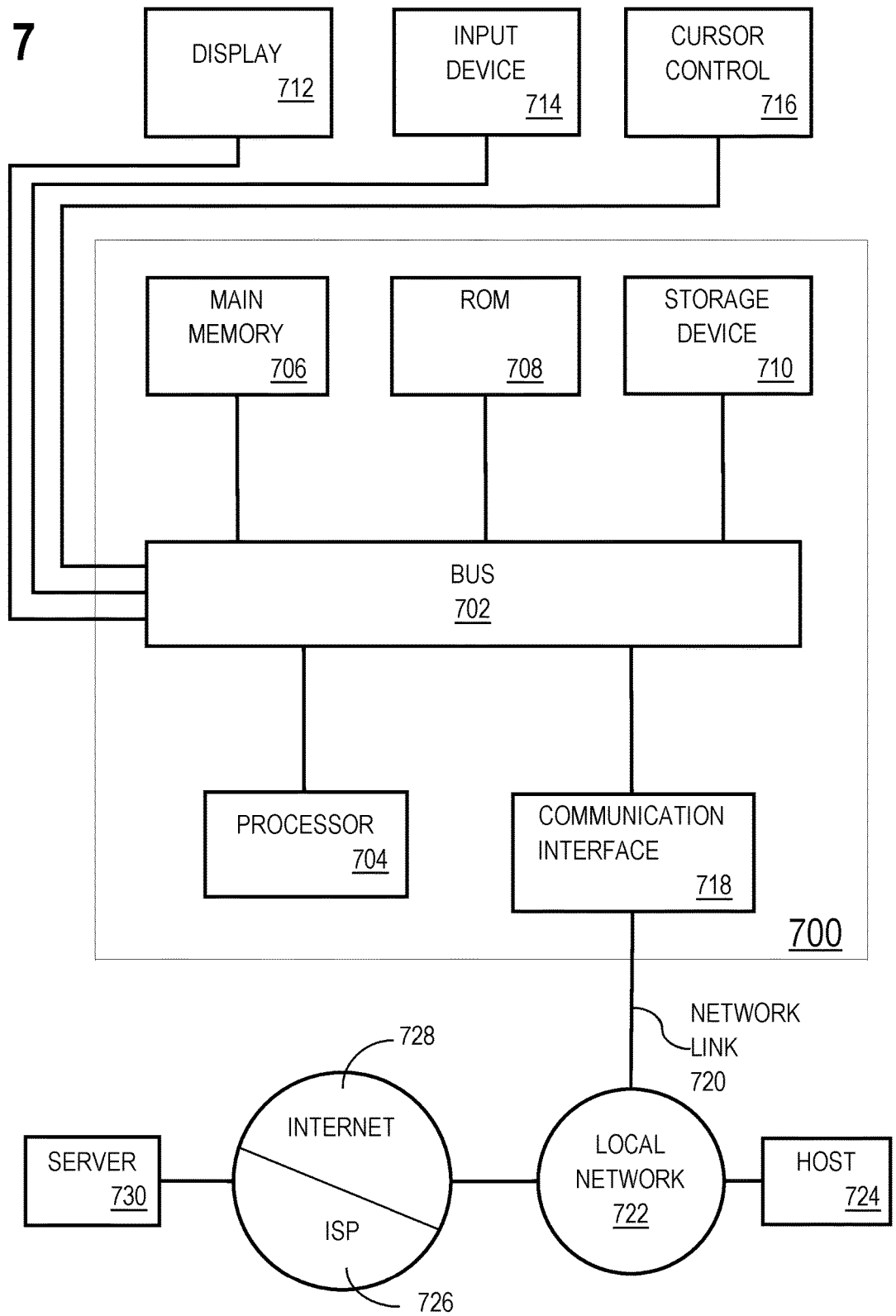
FIG. 7 shows a block diagram that illustrates a computer system in accordance with one or more embodiments.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions, which when executed by one or more hardware processors, cause performance of operations comprising:
   identifying a first content item generated by a first person who is one of a first plurality of members associated with a first entity;
   obtaining a first plurality of entity-specific parameters associated with the first entity;
   comparing one or more portions of the first content item to the first plurality of entity-specific parameters;
   determining that a first portion of the first content item matches a first entity-specific parameter of the first plurality of entity-specific parameters;
   identifying a second content item generated by a second person who is one of a second plurality of members associated with a second entity;
   obtaining a second plurality of entity-specific parameters associated with the second entity;
   comparing one or more portions of the second content item to the second plurality of entity-specific parameters;
   determining that a second portion of the second content item matches a second entity-specific parameter of the second plurality of entity-specific parameters;
   wherein the first entity-specific parameter and the second entity-specific parameter are different, and the first entity and the second entity are different;
   obtaining a request for one or more content items that are associated with a particular master parameter;
   responsive to (a) determining that the first portion of the first content item matches the first entity-specific parameter and (b) determining that the first entity-specific parameter corresponds to the particular master parameter: determining that the first content item is associated with the particular master parameter;
   responsive to (a) determining that the second portion of the second content item matches the second entity-specific parameter and (b) determining that the second entity-specific parameter corresponds to the particular master parameter: determining that the second content item is associated with the particular master parameter; and returning the first content item and the second content item in response to the request.

2. The medium of claim 1, wherein the first set content item comprises at least one of: a job posting, a resume, a user profile, or a forum posting.

3. The medium of claim 1, wherein
the first plurality of entity-specific parameters corresponds to a set of master parameters including the particular master parameter; and
the second plurality of entity-specific parameters corresponds to the set of master parameters.

4. The medium of claim 1, wherein the first plurality of entity-specific parameters is determined from a first web site or a first server hosted by the first entity, and the second plurality of entity-specific parameters is determined from a second website or a second server hosted by the second entity.

5. The medium of claim 1, wherein obtaining the request for one or more content items that are associated with the particular master parameter comprises: receiving a query that uses the particular master parameter as a query term.

6. The medium of claim 1, wherein obtaining the request for one or more content items that are associated with the particular master parameter comprises: receiving a query that uses a third entity-specific parameter as a query term, wherein the third entity-specific parameter is associated with a third entity and corresponds to the particular master parameter.

7. The medium of claim 1, wherein obtaining the request for one or more content items that are associated with the particular master parameter comprises:
identifying a third content item including the particular master parameter; and
generating the request for one or more content items that are associated with the particular master parameter based on the third content item.

8. The medium of claim 1, wherein obtaining the request for one or more content items that are associated with the particular master parameter comprises:
identifying a third content item including a third entity-specific parameter, wherein the third entity-specific parameter is associated with a third entity and corresponds to the particular master parameter, and wherein the third content item is generated by a user associated with the third entity; and
generating the request for one or more content items that are associated with the particular master parameter based on the third content item.

9. The medium of claim 1, wherein:
the first entity-specific parameter maps to a first set of one or more master parameters, including the particular master parameter; and
the second entity-specific parameter maps to a second set of one or more master parameters, including the particular master parameter.

10. The medium of claim 1, wherein:
determining that the first entity-specific parameter corresponds to the particular master parameter comprises determining a first level of association between the first entity-specific parameter and the particular master parameter; and
determining that the first content item is associated with the particular master parameter comprises determining a first score for the first content item based on the first level of association between the first entity-specific parameter and the particular master parameter;

determining that the second entity-specific parameter corresponds to the particular master parameter comprises determining a second level of association between the second entity-specific parameter and the particular master parameter, wherein the first level of association and the second level of association are different; and
determining that the second content item is associated with the particular master parameter comprises determining a second score for the second content item based on the second level of association between the second entity-specific parameter and the particular master parameter.

11. The medium of claim 1, wherein the operations further comprise:
determining a set of scores corresponding to a set of content items, including the first content item and the second content item, based on associations between the set of content items and the particular master parameter; and
responsive to determining that the first content item and the second content item are associated with the highest scores out of the set of scores: returning the first content item and the second content item.

12. The medium of claim 1, wherein determining that the first entity-specific parameter corresponds to the particular master parameter comprises:
identifying a first set of mappings between the first plurality of entity-specific parameters, associated with the first entity, and a set of master parameters;
identifying a first mapping, from the first set of mappings, associated with the first entity-specific parameter and the particular master parameter; and
identifying a level of association between the first entity-specific parameter and the particular master parameter indicated by the first mapping.

13. The medium of claim 1, wherein determining that the first entity-specific parameter corresponds to the particular master parameter is based on a level of similarity between (a) a first set of academic publications, published by the first entity, for use in studying a subject area described by the first entity-specific parameter and (b) a second set of academic publications, published by a third entity, for use in studying a subject area described by a third entity-specific parameter, the third entity-specific parameter being previously mapped to the particular master parameter.

14. A system, comprising:
at least one device including a hardware processor; and
the system configured to perform operations comprising:
identifying a first content item generated by a first person who is one of a first plurality of members associated with a first entity;
obtaining a first plurality of entity-specific parameters associated with the first entity;
comparing one or more portions of the first content item to the first plurality of entity-specific parameters;
determining that a first portion of the first content item matches a first entity-specific parameter of the first plurality of entity-specific parameters;
identifying a second content item generated by a second person who is one of a second plurality of members associated with a second entity;
obtaining a second plurality of entity-specific parameters associated with the second entity;
comparing one or more portions of the second content item to the second plurality of entity-specific parameters;

determining that a second portion of the second content item matches a second entity-specific parameter of the second plurality of entity-specific parameters;

wherein the first entity-specific parameter and the second entity-specific parameter are different, and the first entity and the second entity are different;

obtaining a request for one or more content items that are associated with a particular master parameter;

responsive to (a) determining that the first portion of the first content item matches the first entity-specific parameter and (b) determining that the first entity-specific parameter corresponds to the particular master parameter: determining that the first content item is associated with the particular master parameter;

responsive to (a) determining that the second portion of the second content item matches the second entity-specific parameter and (b) determining that the second entity-specific parameter corresponds to the particular master parameter: determining that the second content item is associated with the particular master parameter; and returning the first content item and the second content item in response to the request.

15. A non-transitory computer readable medium comprising instructions, which when executed by one or more hardware processors, cause performance of operations comprising:

identifying a first content item generated by a first person who is one of a first plurality of members associated with a first entity;

obtaining a first plurality of entity-specific parameters associated with the first entity;

comparing one or more portions of the first content item to the first plurality of entity-specific parameters;

determining that a first portion of the first content item matches a first entity-specific parameter of the first plurality of entity-specific parameters;

identifying a second content item generated by a second person who is one of a second plurality of members associated with a second entity;

obtaining a second plurality of entity-specific parameters associated with the second entity;

comparing one or more portions of the second content item to the second plurality of entity-specific parameters;

determining that a second portion of the second content item matches a second entity-specific parameter of the second plurality of entity-specific parameters;

wherein the first entity-specific parameter and the second entity-specific parameter are different, and the first entity and the second entity are different;

identifying a relationship graph comprising a first master parameter, a second master parameter, and a relationship between the first master parameter and the second master parameter;

obtaining a request for one or more content items that are associated with the second master parameter;

determining that the first entity-specific parameter corresponds to the first master parameter;

determining that the second entity-specific parameter corresponds to the first master parameter;

determining that the first master parameter is related to the second master parameter based on the relationship graph; and returning the first content item and the second content item in response to the request.

16. The medium of claim 15, wherein the relationship graph comprises a tree graph, and the first master parameter is a parent of the second master parameter.

17. The medium of claim 15, wherein the relationship graph comprises a tree graph, and the first master parameter and the second master parameter are associated with a same parent.

18. The medium of claim 15, wherein the relationship graph comprises a tree graph, and the first master parameter and the second master parameter are associated with a same grandparent.

19. The medium of claim 15, wherein the operations further comprise:

determining a first score for the first content item based on (a) a first level of association between the first entity-specific parameter and the first master parameter and (b) a level of proximity between the first master parameter and the second master parameter;

determining a second score for the second content item based on (a) a second level of association between the second entity-specific parameter and the first master parameter and (b) the level of proximity between the first master parameter and the second master parameter; and returning the first content item and the second content item in response to the request based on the first score and the second score.

20. The medium of claim 15, wherein the operations further comprise:

determining a relationship type between the first master parameter and the second master parameter based on the relationship graph;

determining a level of proximity based on the relationship type;

determining a first score for the first content item based on the level of proximity; and returning the first content item based on the first score.

* * * * *